(12) United States Patent
Colligan et al.

(10) Patent No.: US 12,192,591 B2
(45) Date of Patent: Jan. 7, 2025

(54) TRAINING AN ENCRYPTED VIDEO STREAM NETWORK SCORING SYSTEM WITH NON-REFERENCE VIDEO SCORES

(71) Applicant: Spirent Communications, Inc., San Jose, CA (US)

(72) Inventors: Michael Colligan, Sunnyvale, CA (US); Jeremy Bennington, Greenwood, IN (US)

(73) Assignee: Spirent Communications, Inc., San Jose, CA (US)

( * ) Notice: Subject to any disclaimer, the term of this patent is extended or adjusted under 35 U.S.C. 154(b) by 264 days.

(21) Appl. No.: 17/878,813

(22) Filed: Aug. 1, 2022

(65) Prior Publication Data

US 2022/0368995 A1 Nov. 17, 2022

Related U.S. Application Data

(62) Division of application No. 16/842,676, filed on Apr. 7, 2020, now Pat. No. 11,405,695.

(Continued)

(51) Int. Cl.
*H04N 21/647* (2011.01)
*H04N 21/234* (2011.01)

(52) U.S. Cl.
CPC . *H04N 21/64738* (2013.01); *H04N 21/23418* (2013.01); *H04N 21/64784* (2013.01)

(58) Field of Classification Search
CPC ....... H04N 21/64738; H04N 21/23418; H04N 21/64784
See application file for complete search history.

(56) References Cited

U.S. PATENT DOCUMENTS 4,991,007 A 2/1991 Corley
5,181,098 A 1/1993 Guerin et al.
(Continued)

FOREIGN PATENT DOCUMENTS

CN 108090902 A 5/2018

OTHER PUBLICATIONS

Series G: Transmission Systems and Media, Digital Systems and Networks Multimedia Quality of Service and performance—Generic and user-related aspects (ITU-T, G.1022), International Telecommunication Union, Jul. 2016, 34 pages.

(Continued)

*Primary Examiner* — Kyu Chae
(74) *Attorney, Agent, or Firm* — Haynes Beffel & Wolfeld LLP; Ernest J. Beffel, Jr.

(57) ABSTRACT

At least three uses of the technology disclosed are immediately recognized. First, a video stream classifier can be trained that has multiple uses. Second, a trained video stream classifier can be applied to monitor a live network. It can be extended by the network provider to customer relations management or to controlling video bandwidth. Third, a trained video stream classifier can be used to infer bit rate switching of codecs used by video sources and content providers. Bit rate switching and resulting video quality scores can be used to balance network loads and to balance quality of experience for users, across video sources. Balancing based on bit rate switching and resulting video quality scores also can be used when resolving network contention.

14 Claims, 12 Drawing Sheets

(7 of 12 Drawing Sheet(s) Filed in Color)

Related U.S. Application Data

(60) Provisional application No. 62/831,114, filed on Apr. 8, 2019.

(56) References Cited

U.S. PATENT DOCUMENTS

| | | | |
|---|---|---|---|
| 5,351,201 | A | 9/1994 | Harshbarger, Jr. et al. |
| 6,542,185 | B1 | 4/2003 | Bogardus |
| 9,380,297 | B1 | 6/2016 | Djurdjevic |
| 9,591,300 | B2 | 3/2017 | Djurdjevic |
| 2004/0066454 | A1 | 4/2004 | Otani et al. |
| 2004/0085256 | A1 | 5/2004 | Hereld et al. |
| 2005/0020357 | A1 | 1/2005 | Oe |
| 2007/0091201 | A1 | 4/2007 | Sasaki |
| 2007/0091334 | A1 | 4/2007 | Yamaguchi et al. |
| 2007/0217448 | A1* | 9/2007 | Luo ............... H04L 47/283 370/468 |
| 2010/0157047 | A1 | 6/2010 | Larkin et al. |
| 2010/0309231 | A1 | 12/2010 | Stauder et al. |
| 2011/0102602 | A1 | 5/2011 | Leventu et al. |
| 2013/0027568 | A1 | 1/2013 | Zou et al. |
| 2013/0057705 | A1* | 3/2013 | Parker ............ H04N 21/64723 348/184 |
| 2013/0293725 | A1 | 11/2013 | Zhang et al. |
| 2013/0305106 | A1 | 11/2013 | Mittal et al. |
| 2014/0176730 | A1 | 6/2014 | Kaji et al. |
| 2015/0135209 | A1 | 5/2015 | LaBosco et al. |
| 2015/0279037 | A1 | 10/2015 | Griffin et al. |
| 2015/0365725 | A1 | 12/2015 | Belyaev et al. |
| 2016/0165225 | A1 | 6/2016 | Djurdjevic |
| 2016/0165226 | A1 | 6/2016 | Djurdjevic |
| 2016/0353138 | A1 | 12/2016 | Bennington |
| 2016/0358321 | A1 | 12/2016 | Xu et al. |
| 2019/0138938 | A1* | 5/2019 | Vasseur ............ H04L 41/147 |
| 2019/0334824 | A1* | 10/2019 | Jana ............... H04L 67/02 |

OTHER PUBLICATIONS

Series P: Telephone Transmission Quality, Telephone Installations, Local Line Networks Models and tools for quality assessment of streamed media (ITU-T, P.1203). International Telecommunication Union, Oct. 2017, 22 pages.

Per-Title Encode Optimization, Netflix Technology Blog, Dec. 14, 2015, 21 pages (downloaded from https://medium.com/netflix-techblog/per-title-encode-optimization-7e99442b62a2, Jan. 29, 2019.

Kayargadde et al., "Perceptual characterization of images degraded by blur and noise: model", Institute for Perception Research, P.O. Box 513, 5600 MB Eindhoven, The Netherlands, Journal of the Optical Society of America A, vol. 13, No. 6, Jun. 6, 1996, pp. 1178-1188.

Seshadrinathan, et al., "A Subjective Study to Evaluate Video Quality Assessment Algorithms", Intel Corporation, Chandler, AZ—USA. The University of Texas at Austin, TX—USA., Jan. 1, 2010, 10 pages.

Farias, et al., "Perceptual Contributions of Blocky, Blurry, and Fuzzy Impairments to Overall Annoyance", Proceedings of SPIE, vol. 5292, Department of Electrical and Computer Engineering, Department of Psychology, UCSB, Santa Barbara, CA 94106 USA, Jun. 2004, pp. 109-120.

Xu, "Video Telephony for End-consumers: Measurement Stufy of Google+, iChat, and Skype," Networking, IEEE/ACM Transactions, vol. 22, Iss.3, 2014, pp. 17.

Castaner, "Why We Didn't Implement Mean Opinion Score (MOS) in Avalananche Adaptive Bitrate," Spirent Blogs, Nov. 30, 2012, pp. 5.

"8100 Mobile Device Test System UMTS Video User Expereince Module," Spirent Communications Inspired Innovation, Rev. A 07/08, 2008, pp. 2.

Videoconferencing (VC), accessed Mar. 19, 2015, <http://en.wikipedia.org/wiki/Videoconferencing> pp. 4.

H. Schulzrinne, et al., "RTP: A Transport Protocol for Real-Time Applications," RFC 11889, (2015), pp. 150.

"Opinion model predicting gaming quality of experience for cloud gaming services", Series G: Transmission Systems and Media, Digital Systems and Networks Multimedia Quality of Service and performance—Generic and user-related aspects (ITU-T, G.1072), International Telecommunication Union, Jan. 2020, 20 pages.

"Opinion model for network planning of video and audio streaming applications", Series G: Transmission Systems and Media, Digital Systems and Networks Multimedia Quality of Service and performance—Generic and user-related aspects (ITU-T, G.1071), International Telecommunication Union, Nov. 2016, 42 pages.

Andrea Di Domenico et al, "A Network Analysis on Cloud Gaming—Stadia: GeForce Now and PSNow", MDPI Network (2021). DOI: https://doi.org/10.3390/network1030015.

Castaner, "Why We Didn't Implement Mean Opinion Score (MOS) in Avalanche Adaptive Bitrate," Spirent Blogs, Nov. 30, 2012, pp. 5.

U.S. Appl. No. 18/227,885, filed Jul. 28, 2023, Pending.
U.S. Appl. No. 16/842,676, filed Dec. 11, 2018, U.S. Pat. No. 11,216,698, Jan. 4, 2022, Granted.
U.S. Appl. No. 14/667,557, filed Mar. 24, 2015, U.S. Pat. No. 9,591,300, Mar. 7, 2017, Granted.
U.S. Appl. No. 14/667,540, filed Mar. 24, 2015, U.S. Pat. No. 9,380,297, Jun. 28, 2016, Granted.

* cited by examiner

FIG. 3 Pristine

FIG. 4 Blur

FIG. 5 Noise

FIG. 6 Block

TRAINING AN ENCRYPTED VIDEO STREAM NETWORK SCORING SYSTEM WITH NON-REFERENCE VIDEO SCORES

CROSS-REFERENCE

This application is a divisional of U.S. application Ser. No. 16/842,676, filed Apr. 7, 2020, now U.S. Pat. No. 11,405,695, issued Aug. 2, 2022 which claims the benefit of U.S. Provisional Patent Application No. 62/831,114, entitled "TRAINING AN ENCRYPTED VIDEO STREAM NETWORK SCORING SYSTEM WITH NON-REFERENCE VIDEO SCORES", filed Apr. 8, 2019, which is hereby incorporated by reference for all purposes.

This application is related to U.S. Non-Provisional patent application Ser. No. 16/216,699, entitled "TRAINING A NON-REFERENCE VIDEO SCORING SYSTEM WITH FULL REFERENCE VIDEO SCORES", filed Dec. 11, 2018, which claims the benefit of U.S. Provisional Patent Application No. 62/710,458, entitled "TRAINING A NON-REFERENCE VIDEO SCORING SYSTEM WITH FULL REFERENCE VIDEO SCORES", filed Feb. 16, 2018.

FIELD OF THE TECHNOLOGY DISCLOSED

This technology disclosed applies to the field of impaired network video quality monitoring (IN VQM). Specifically, it describes using non-reference perceptual video quality analysis (NR VQA) scores, network statistics and machine learning techniques, with user device and video source pairs to produce a network scoring system that can approximate a video mean opinion score (VMOS) for streaming video without decrypting the streaming video.

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves may also correspond to implementations of the claimed technology.

A perceived video mean opinion score (VMOS) for streaming video means a score that a panel of users would assign to a video after watching it. It is a score for the quality of the video delivery, not for the content or cinematography. Because panels are cumbersome and expensive to assemble, it is desirable to substitute computer-based systems that rely on rules or formulas for subjective human evaluations. The computer-based systems need to reproduce human subjective scores over a wide range of content.

Some current models analyze operation of network components that contribute to user video streaming experience, without attempting to evaluate a user's subjective experience of the video displayed. Available models are described in standards such as ITU-T G.1022 "Buffer models for media streams on TCP transport" and P.1203 "Parametric bitstream-based quality assessment of progressive download and adaptive audiovisual streaming services over reliable transport" of the Telecommunication Standardization Sector of the International Telecommunication Union (ITU). Limitations on the technology described in these standards are self-evident. For instance, P.1203, at 6, declares that the technology described is "not intended" for either "Direct comparison/benchmarking of encoder implementations, and thus of services that employ different encoder implementations" or for "Evaluation of visual quality including display/device properties". How P.1203 builds on G.1022 is briefly suggested in G.1022 Appendix II.

Prediction of user experience is complicated because streaming video service providers have different methods to encode, transmit, buffer and display video. They may provide different mobile device apps to receive and display video. Hence a predictive system must be adapted to user choices of device and service pairs. Prediction is further complicated by encryption of media payload and media frame headers, which complicate rendering of video streams in live networks.

An opportunity arises to address the need of network and media service operators, video service operators and device manufacturers to determine the perceived quality of video found in video distribution systems in the absence of the ability to render the video into images for quality measurement, and only measuring the transmission of video over the IP network. This approach can overcome the human observation inaccuracy, as well as cost and time constraints associated with impaired network video quality monitoring (IN VQM), by automating the collection of the perceptual video metrics and stall and startup time metrics.

SUMMARY

A simplified summary is provided herein to help enable a basic or general understanding of various aspects of exemplary, non-limiting implementations that follow in the more detailed description and the accompanying drawings. This summary is not intended, however, as an extensive or exhaustive overview. Instead, the sole purpose of the summary is to present some concepts related to some exemplary non-limiting implementations in a simplified form as a prelude to the more detailed description of the various implementations that follow.

This disclosed technology produces a training set and trains an impaired network video quality analyzer (IN VQA), using automating the collection of the perceptual video metrics and network metrics, including video stream startup time and stall metrics, with attention to user chosen device and video source pairs. The resulting IN VQA can be applied to live networks to evaluate video delivery quality to proprietary apps running on mobile devices addresses. This provides a tool for wireless service providers (WSPs), cloud service providers (CSPs) and video source providers to accurately monitor their service quality, evaluate the impact of throttling video services and tune their networks. Device manufacturers can benchmark performance of their devices on various networks across video streaming services.

The disclosed technology can use a trained non-reference model (NR VQA) to generate a training set that is used to train a new parametric model, which correlates IP network behavior and device video source pairs to video quality.

BRIEF DESCRIPTION OF THE DRAWINGS

The patent or application file contains at least one drawing executed in color. Copies of this patent or patent application publication with color drawing(s) will be provided by the Office upon request and payment of the necessary fee. The color drawings also may be available in PAIR via the Supplemental Content tab.

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings.

DETAILED DESCRIPTION

Figure 1:
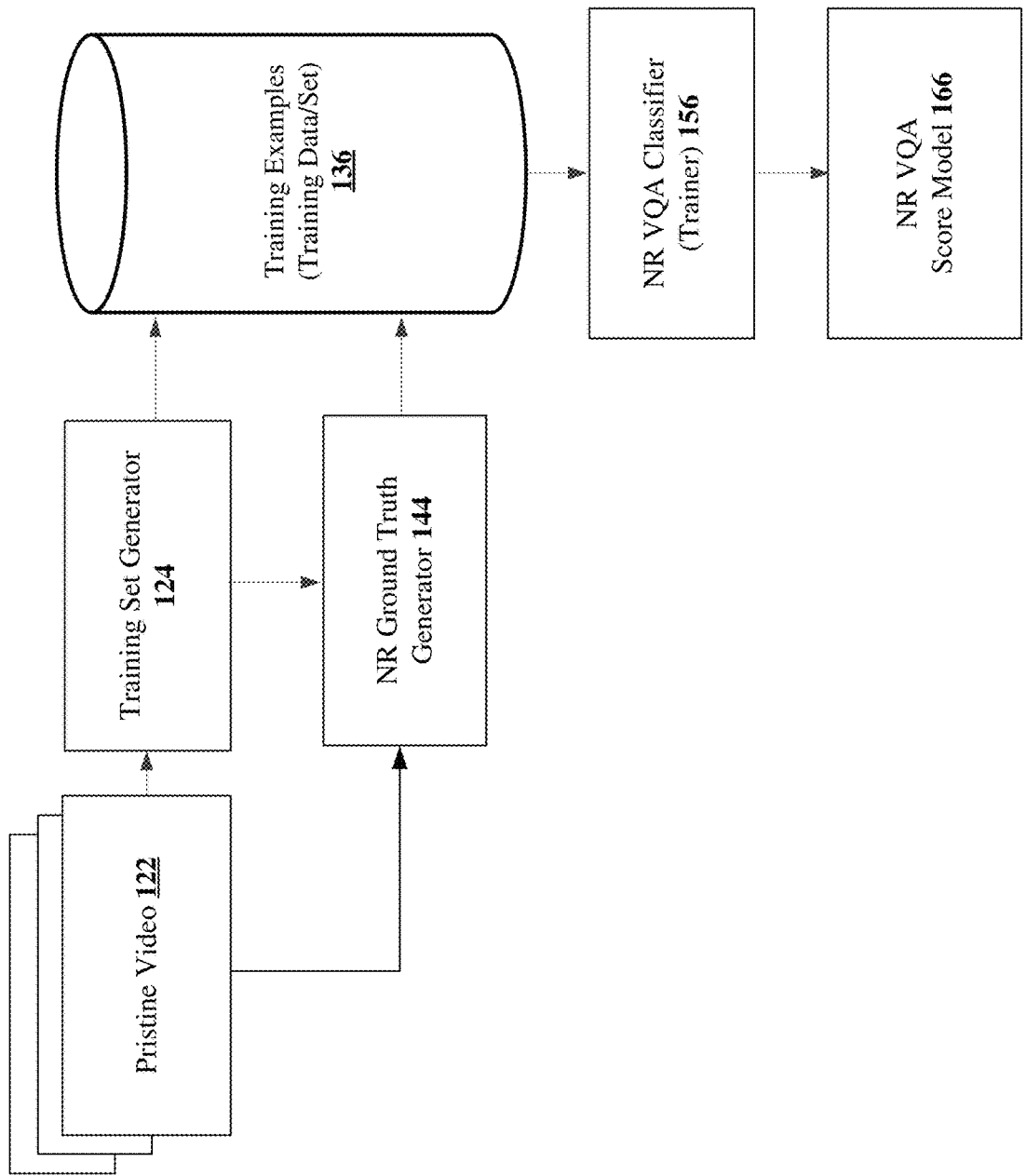
FIG. 1 depicts example architecture for generating NR training data using full reference (FR) video and FR video mean opinion score (VMOS), generating synthetically impaired videos using filters tuned to generate impairments that approximate the reference FR VMOS video and score.

The following detailed description is made with reference to the figures. Sample implementations are described to illustrate the technology disclosed, not to limit its scope, which is defined by the claims. Those of ordinary skill in the art will recognize a variety of equivalent variations on the description that follows.

Introduction

Network operators who deliver video over mobile and broadband networks need an objective way to evaluate delivered video quality even though they do not own the video content and therefore cannot directly measure the video quality, but only gather network statistics. Media-service providers such as Netflix, Amazon Prime, HBO Go and Hulu also need to be able to evaluate the quality of the video delivery, even though they do not own the network infrastructure. Full-reference video quality analysis (FR VQA) techniques, which compare received video to full quality reference video frames, effectively require content ownership, because they require comparison of delivered video a pristine version of a video content. This FR VQA approach cannot be applied to evaluate live network video streaming, because providers do not have access to either the pristine original or images displayed to users on their personal devices.

Video performance benchmarking and monitoring of live mobile networks helps media-service providers determine how well their networks deliver content to mobile handsets, compared to the networks of other providers. Smart TV and other device vendors can regression test new software releases in the lab. Video performance benchmarking also enables video services providers to understand how their applications consume network bandwidth and how well they fare when the network is less than ideal.

Builders of content services and video devices can benefit from an objective way to evaluate video quality during development of new services and devices. In one example, a developer can receive and evaluate video using beta versions of their firmware and then be able to change their display driver firmware and retest.

The technology disclosed builds on prior work by this team, which developed a non-reference video quality analyzer (NR VQA). The prior work described how an image classifier could be trained using pairs of full reference video frames and synthetically impaired video frames, scored by a full reference video quality analyzer, to generate ground truth for training a NR VQA classifier. The trained classifier can to produce quality scores from video frames captured on personal devices, without access to reference video. More details are found in the prior application Ser. No. 16/216, 699, which is incorporated above by reference.

A weakness of the prior disclosed technology was that the trained classifier scored rendered video. This is a challenging requirement for in-field quality analysis or monitoring, as opposed to in-lab assessment and qualification of devices for deployment. In-field work is complicated by lack of control over encryption, by user choices of device, and video service pairs. In a troubleshooting scenario, a technician could theoretically capture video frames from devices that users use, but doing so would be cumbersome. More generally, the technician could deploy a passive device to evaluate packet streams, but encryption and digital rights management laws would prevent a packet sniffer from rendering the streams as video frames for scoring.

The nature of video artifacts that detract from user experience has changed substantially as bandwidth has increased. Higher bandwidth and powerful devices with large buffers have induced streaming services to switch from unreliable to reliable transport protocols, such as UDP to TCP. When dropped and errored frames cause retransmission and when available bandwidth drops, adaptive codecs decrease bit rate and encoder quality to minimize halting of streams during (re)transmission.

The technology disclosed addresses the changed environment of reliable transport, encryption, and diversity of device and service pairings. Our technology controls network impairment of video delivery by streaming services to generate training sets, without any direct control over how the services chose to stream video.

While our technology does not control the video services, it does control network conditions, for training, in a way that forces service codecs to adapt their encoding and bit rates. In real time, the technology disclosed uses a network impairment emulator to control jitter, packet loss, out-of-order packet delivery, packet duplication and available bandwidth. Systematic control of network impairment parameters over multiple instances of video replay produces a good sample of encoding strategies used by a service and of resulting video quality at user devices. In a controlled impairment setting, unlike the field, video can be captured directly from devices, preferably by HDMI or other wired capture, or, alternatively, by wireless casting or a camera capturing frames from the display.

Video captured during controlled network impairment can be analyzed using a NR VQA, such as disclosed in the team's prior application, or by another video quality analyzer. Then, sampled network conditions on the impaired network, combined with device type, media source and frame quality scoring can be used to train an impaired network video quality analyzer (IN VQA). This technology takes a step beyond the NR VQA, because it does not require access to rendered video. Once an IN VQA classifier is been trained on device and service pairings under impaired and unimpaired network conditions, rendered video becomes unnecessary. During training, the IN VQA may learn across device and service pairings. A particular service might produce similar video quality scores across devices from the same device manufacturer. Or a service might produce similar video quality scores across devices that use the same operating system.

In many environments, codec parameters used by video services may be available despite encryption, in unencrypted headers. To the extent that the video codec parameters are available, availability of codec settings may reduce the amount of training data required. It may also change the pattern of training data collection.

NR VQA Described

Figure 8:
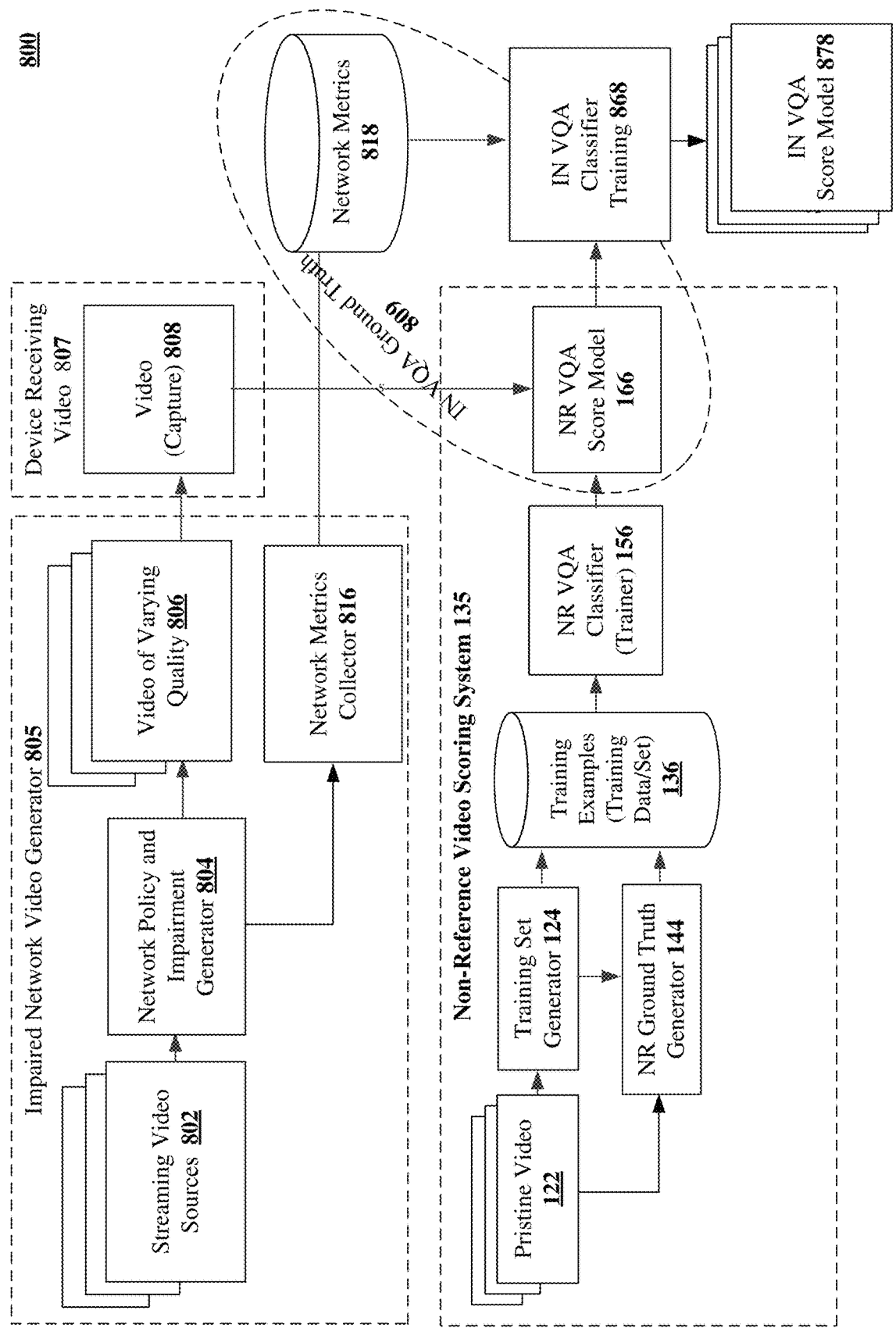
FIG. 8 builds on the example architecture of FIG. 1, using a trained NR VQA to score video from commercial video streaming sources, such as YouTube. These commercial video sources can only be indirectly controlled by synthetic network impairment. The impaired network video generator controls invocation of the streaming video sources and impairment of network to generate a training set that is used to train the IN VQA.

The first section of technology description, about the NR VQA, is reproduced from application Ser. No. 16/216,699, which was incorporated above by reference. The NR VQA description informs understanding of the present IN VQA work. The NR VQA itself provides one source of ground truth for training the IN VQA classifier, as depicted in FIG. 8, which includes parts of FIG. 1 used to generate a training set.

Humans do not need an A-B comparison to determine how good something looks. We recognize blockiness, blurriness and choppy motion as the impairments that they are. Using a kind of artificial intelligence known as machine learning technology, systems are able to automatically recognize these artifacts by evaluating the displayed video, and then scoring the video with a metric that correlates tightly to human perceptual scores. A learning algorithm is typically tested for impaired videos relative to ground truth scores from subjective testing with humans. A neural-network-based learning system can be trained to score videos, using a large training set, as machine learning models improve, in terms of prediction precision, as the training data set size increases.

NR algorithms could be trained on subjectively scored video samples and scores, but this approach is limited by the short supply of subjectively scored video and the cost of collecting subjective scores in large quantities. It is both expensive and time consuming to collect subjective scores even in small quantities. For example, fifty college students can be tasked to rate hundreds to thousands of images, which will yield only 5,000 to 50,000 data points.

The disclosed technology enables video testers to determine the quality of transmitted video, scoring video quality on a 1 to 5 video mean opinion score (VMOS) scale, without needing to compare the video to a pristine full reference video. Our technology enables training a NR VQA classifier or neural network on videos and video scores generated by accepted and standardized FR VQA algorithms. The disclosed technology overcomes both the cost and time constraints by automating the generation of the training data IN the form of artificially impaired videos, the generation of training scores, and the production of the models that are used by the NR VQA classifier to score videos. A system for evaluating streaming video delivery quality over a network is described next.

Figure 3:
FIG. 3 shows an example image from a pristine video.

FIG. 1 depicts example architecture 100 for generating NR training data using full reference (FR) video and FR video mean opinion score (VMOS), generating synthetically impaired videos using filters tuned to generate impairments that approximate the reference FR VMOS video and score. Video artifacts can be introduced at many points along the video distribution and reproduction chain: at video capture, during encoding, while traversing the network, and during decoding and display. An assumption is made that the more similar a set of training videos are to the type of videos to be performance benchmarked, the more precisely the results will predict subjective scores for similar test videos. In some implementations, the training can be performed using families of similar training videos, such as training separately for high-motion-content videos and for low-motion-content videos. Pristine video 122 includes a set of pristine videos of the highest quality available according to subjective analysis by relative experts in the video field, chosen such that their quality is greater than or equal to the intended use for the subsequently created score generator. FIG. 3 shows an example image from a pristine video. For example, to create a score generator for analyzing highly compressed 1920×1080 resolution videos, pristine video 122 includes lightly compressed or uncompressed video of equal resolution to 1920×1080, and subjective VMOS of 5.0 or nearly 5.0, to establish an absolute reference point for ground truth generator 144, which provides relative video quality scores.

Pristine video 122 is input to training set generator 124 that produces a training dataset that contains a large number of calibrated impaired video sample clips, based on the pristine full reference video, and stores the video sample clips in training examples 136. Training set generator 124 transcodes pristine video with various quality-affecting settings such as quantization parameter, constant rate factor and the application of various image filters. The resulting videos exhibit one or more impairments and various degrees of impairments. The types and degrees of impairments determine the ability of the resulting score generator to accurately detect the same. Types and degrees of impairment can be varied independently of each other, and can be mixed and matched. Rather than a training set with a few key types of artifact samples spread across a few select types of scenes, training set generator 124 covers a vast array of artifact samples, with each type of artifact and each degree of distortion being represented in a wide variety of video content. Example impaired video sample clips include camera artifacts, coding and compression artifacts, and network distribution artifacts. Rather than using a dataset limited to hundreds of samples, the disclosed training dataset contains literally hundreds of thousands of sample videos. We describe further details of types of impairments and the resulting analysis opportunities infra.

Continuing the description of architecture 100, ground truth generator 144 utilizes pristine video 122, receives the calibrated impaired video sample clips from training set generator 136, generates associated video quality scores for each video sample clip, and stores each video sample clip with its respective score in training examples 136. That is, ground truth generator 144 is a FR VQA system used together with pristine FR video and synthetically impaired videos to produce very large amounts of scored training data.

Figure 5:
FIG. 5 shows an example resulting image with noise impairment, relative to the pristine image shown in FIG. 3.

Further description of types of video impairments and the resulting analysis opportunities are offered. Consider camera artifacts arising from errors in photography rather than from other sources such as damaged hardware. Photographic errors are generally related to issues with improper lighting or focus. Insufficient lighting leads to a grainy appearance and a loss of detail. Training set generator 136 can create these effects synthetically by applying a grainy image filter to each of the frames in a video sequence. Such image filters are available in common video editing software such as FFMPEG. Grainy filters can be used to apply varying degrees of noise to some or all areas of frames. FIG. 5 shows an example resulting image with noise impairment as can be seen in graininess 524, relative to the pristine image shown in FIG. 3. By varying the degree of graininess applied to an otherwise pristine video and by using ground truth generator 144, a FR VQA system, to score the resulting video, the level of graininess that corresponds to a VMOS score can be determined and a family of grainy training videos, each with a varying level of graininess and with a known effect on VMOS can be generated.

Figure 4:
FIG. 4 shows an example resulting image with blurriness impairment, relative to the pristine image shown in FIG. 3.

Training set generator 136 also creates training videos with focus impairments, in this case, applying a blur filter. Blurring is the result of improper focus on the image subject or a shutter speed that is too slow for the relative motion of the image subject. Training set generator 136 applies the blur filter to apply varying degrees of blur to some or all areas of video frames of an otherwise pristine video. As described supra, ground truth generator 144 scores the resulting videos to determine what level of blurriness corresponds to what VMOS score. Training set generator 136 then creates a family of blurry training videos each with a varying level of blurriness and with a known effect on VMOS. FIG. 4 shows an example resulting image with blurriness impairment, relative to the pristine image shown in FIG. 3. The athlete's sleeve 466 is particularly blurry.

Figure 6:
FIG. 6 shows an example image with block-based impairment, relative to the pristine image shown in FIG. 3.

Compression and coding artifacts that we consider arise from insufficient bandwidth allocation during the encoding process. We recognize that most modern codecs use a form of block-based lossy compression to reduce data size. Video frames are divided into blocks of pixels of various sizes and then each block is encoded separately. The result of this process is that there can be image discontinuities along pixel block boundaries. These blocky edges may be quite noticeable and may have a large effect on video quality perception. FIG. 6 shows an example resulting image with block-based impairment as seen in the athlete's forearm 626, relative to the pristine image shown in FIG. 3.

Training set generator 136 synthesizes blockiness artifacts by over-compressing training videos. There are three ways that we can do this. In each case we start with a pristine video. In the first case we use the CRF (constant rate factor) option in our transcoding process. CRF is a setting that will cause the encoder to attempt to maintain a specified level of quality regardless of the number of bit that must be allocated to do so. CRF values range from 0 to 51 where 0 is the highest level of quality and 51 is the lowest. For example, if we transcode a pristine video with all attributes remaining the same as the original but with a CRF value of 25, we can create an impaired video with reduced quality that is consistent frame to frame throughout the video. If we then score this video using ground truth generator 144, a FR VQA system, we see consistent VMOS scores frame to frame. By transcoding the pristine video using all possible CRF values training set generator 136 offers a family of impaired videos with a full range of compression impairments.

In the second case we use the QP (quantization parameter) option in our transcoding process. QP is a setting that will cause the encoder to remove high frequency DCT (discrete cosine transformation) coefficients that are smaller than the specified QP value from the resulting compressed video data. The effect of doing this is that fine image details smaller than the specified QP setting will be lost. The higher the QP value, the more detail that is lost and the smaller the resulting video data size. Visually, the loss of detail is equivalent to blurry edges. QP values range from 1 to 31 where 1 is the lowest quality setting and 31 is the highest. Unlike CRF, the QP option does not produce a uniform quality level from frame to frame. Instead, it is used to reduce the size of the video data by removing a certain level of detail from the entire video. For example, if we transcode a pristine video with all attributes remaining the same as the original but with a QP value of 15, we can create an impaired video with reduced quality that has roughly the same level of detail from frame to frame throughout the video. If we then score this video using a FR VQA method, we would expect to see different VMOS scores frame to frame depending on how much detail a frame originally contained. By transcoding the pristine video using all possible QP values training set generator 136 provides a family of impaired videos with a full range of compression impairments.

In a third case we use the B (bitrate) option in our transcoding process. B is a setting that will cause the encoder to maintain a fairly constant bitrate that can be configured to not exceed a maximum bitrate. The net effect of doing this is that frames with a high amount of detail will be more highly compressed than frames with a low amount of detail. Those that are more highly compressed will be more impaired. Visually, the higher the level of compression the more we would expect to see both blocky edges as well as the loss of fine details. The bitrate may be set to correspond to the target distribution system for our model. For example, if we wish to train a model that can be used to score videos distributed over a 3 Mbps network channel, we may choose our transcoding bitrate to be 3 Mbps or less. We start with a pristine video that has a higher bitrate than our target bitrate and then transcode it with a variety of bitrates such that it meets the expected distribution system's bitrates. If we then score these videos using ground truth generator 144 we see VMOS scores that generally increase as the bitrate increases.

Distribution system artifacts that we consider are those arising from the loss of video data as it is transmitted to an end-point, in one implementation. In a buffered video delivery system, loss of data results in one of two impairments. Either the video will freeze on the last successfully received frame or it will display the absence of a frame (which may involve displaying some indicator that it is waiting for the next frame).

A video freeze can be synthesized simply by transcoding a pristine video but with a frame repeat option used on one or more segments of the video. When ground truth generator 144 scores the resulting video, repeated frames with the same VMOS score as the first repeated frame in the series or show a reduced VMOS score for repeated frames to reflect the fact that it is impaired, depending on the implementation.

A black frame or stalled video impairment can be synthesized by splicing black, nearly black, or stall indication video segments into an otherwise pristine video during the transcoding process. A stall indication video segment example is the black frame with spinning progress wheel sometimes seen during on-demand video streaming when re-buffering occurs. When ground truth generator 144 scores the resulting video it will either produce a high VMOS score indicating that the screen is black and not impaired, or it will interpret the repeated black frames as impairment and score those frames as a low VMOS score, dependent on the use case and implementation.

In both examples of stalled video delivery, additional information is required to determine if the video is impaired or if the video sequence does indeed contain legitimate segments with little or no motion or information. For NR model training, such frames will be interpreted as having a VMOS of 5 and it is up to the NR VQA method using the NR model to determine if the distribution system has been impaired. This can be determined by measuring network activity, by comparing the temporal and spatial information measurements to known stall indications, or by a combination of both approaches.

Applying filters to pristine videos and scoring the resulting videos with a FR VQA ground truth generator 144, rather than subjective human scoring, is what makes the disclosed technology unique. No subjective scores are required for this automated process, so it can be scaled to a very large number of training videos.

With pristine video 122 and impaired versions of those videos with known types and degrees of impairments as training examples 136, ground truth generator 144 utilizes input pristine and impaired pairs of the same video in a FR VQA process, which produces a DMOS (differential video mean opinion score) for each pair. Since the reference videos were chosen to be the highest level of quality, the resulting DMOS scores can be taken as absolute scores, not merely differential scores. This is important since we want to know the absolute VMOS scores of the impaired videos.

With FR absolute VMOS scores and with the associated impaired videos we can now use these pairs to train our NR VQA classifier 156. We start by computing feature scores for a designated set of video characteristics for each impaired video and then associate those feature scores to the FR absolute VMOS score for each impaired video. Then, we use the features scores and the VMOS score as a support vector to use in SVM (support vector machine) training. The complete set of support vectors used (i.e. the complete set of impaired videos, video feature scores, and absolute VMOS scores) are then used to build a hyperplane regressor which represents NR VQA score model 166. That is, these scored training examples 136 are the training set inputs for training NR VQA classifier 156, which can be implemented as a support vector machine (SVM), utilizing the resultant dataset of training examples 136 and generating VQA scores that correlate closely with a FR VQA system. An SVM trained model improves in accuracy and effectivity as the number of data points increases. One implementation of this architecture utilizes a cloud computation platform capable of processing thousands, if not millions, of iterations (such as Amazon EC2) which can process the number of videos and produce the number of support vectors required to create accurate video scores within a reasonable number of hours or days. Other classifiers can also be used.

Training pairs of example videos and scores, without reference to a corresponding pristine video, can also be used to train a neural network model such as a multi-layer convolutional neural network (CNN) or hybrid LSTM/CNN network in some implementations. Each frame or just a sampling of frames can be used, as the VQA depends more on the quality of individual frame than time dependent relationship among frames. Implementations for specific use cases can combine the use of data for the specific video environments to be tested, and can emphasize detection of a variety of artifacts, including NR compression, NR buffering and NR scaling.

The trained NR VQA classifier 156 input for NR VQA score model 166 is not dependent on full reference video. In one implementation, NR VQA score model 166 is implemented based on a variation of Blind/Referenceless Image Spatial Quality Evaluator (BRISQUE) no-reference video quality assessment, a state-of-the-art natural scene assessment tool developed at the University of Texas at Austin's Laboratory for Image and Video Engineering (LIVE). BRISQUE has become one of the most-used quality assessment tools in broadcast and content production environments.

Figure 2:
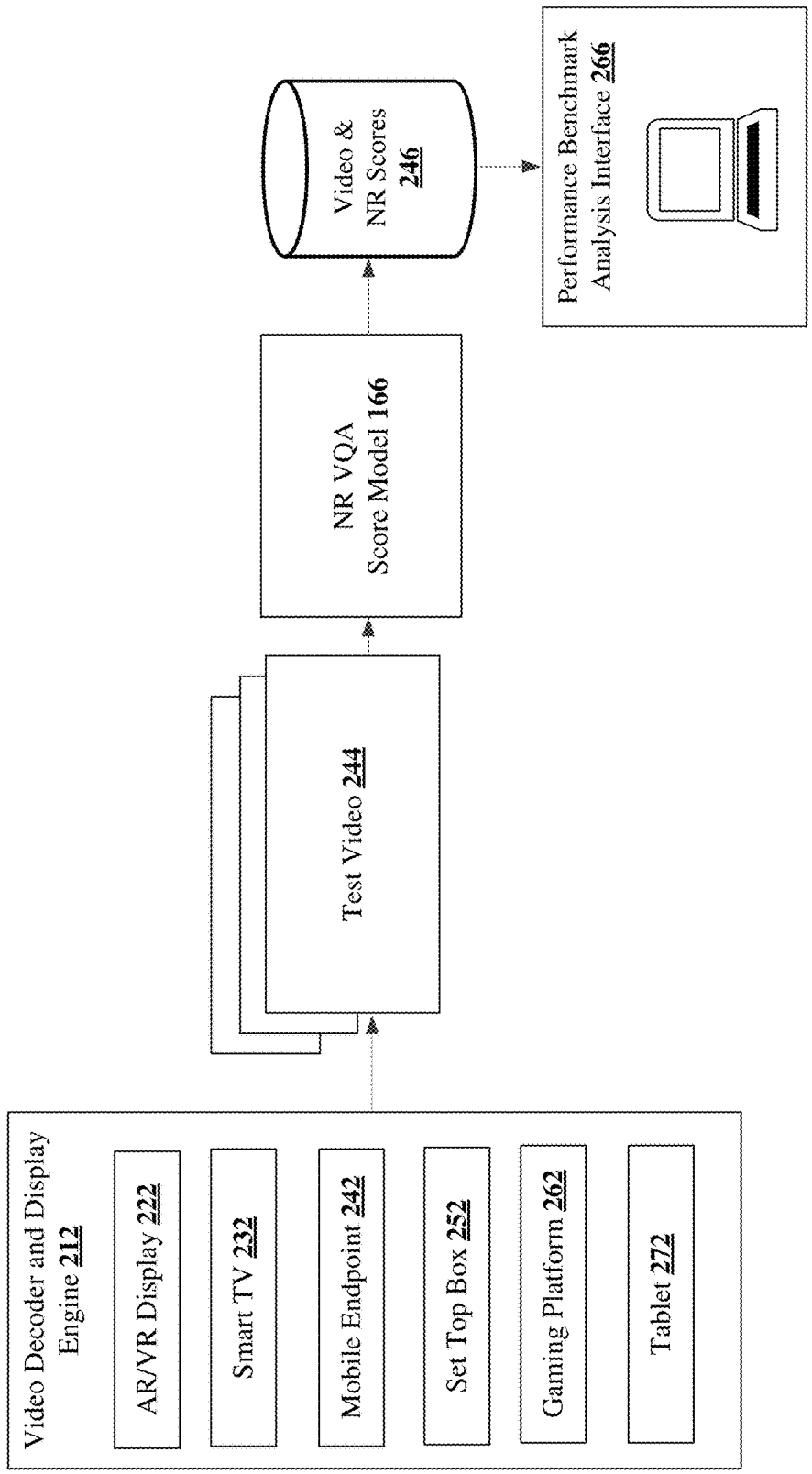
FIG. 2 depicts example test architecture for performing NR VQA on test videos, for which access to pristine full reference video is not available for comparison.

FIG. 2 depicts example test architecture 200 for performing NR VQA on test videos, for which access to pristine full reference video is not available for comparison. Video decoder and display engine 212 captures and decodes videos from many sources: augmented reality and virtual reality AR/VR display 222, smart TV 232, mobile endpoint 242, set top box 252, gaming platform 262 and table 272 as test video 244. Examples of augmented reality experiences include Snapchat lenses and the game Pokemon Go. Virtual reality (VR) implies a complete immersion experience that shuts out the physical world. Video decoder and display engine 212 can also capture and decode videos from additional video sources not explicitly named here. Test video 244 gets scored using NR VQA score model 166 which has been previously generated as described relative to architecture 100. NR VQA score model 166 process begins by computing features scores for a designated set of video characteristics for each test video and uses the results of training with a very large NR data set with hundreds of thousands of samples, as described previously, to determine what NR VMOS value to associate with those feature scores. The result is an absolute NR VMOS for each test video, which can be stored in video and NR scores 246 and can be utilized for performance benchmarking either automatically or by an operator via performance benchmark analysis interface 266.

Comparison to a well-known metric shows over 90% correlation between the intended score and results obtained using the disclosed technology. VMAF, the Video Multimethod Assessment Fusion metric developed by Netflix and the University of Southern California, is a well-known metric that is one of the best in the industry. The VMAF video scoring system combines human perceptual vision modeling with artificial intelligence to produce a 1-to-100 scale quality score. Note that VMAF relies on a pristine reference video for comparison. VMAF has been shown to be superior to many other algorithms in terms of its ability to produce a score that is well correlated to how people rate video quality. In another implementation, the disclosed non-reference NR VMOS model can be trained to model a different VMOS model, such as peak signal-to-noise ratio (PSNR), perceptual evaluation of video quality (PEVQ) or structural similarity index (SSIM), instead of VMAF. The disclosed technology produces video sequence NR VMOS scores for the video sequences that can satisfy a predetermined correlation with standards-based FR VMOS scores.

We use a four-step process to determine how well the disclosed technology compares to the full-reference VMAF metric. First, we create a score baseline data set containing several thousand video clips, beginning with source videos that contain a wide variety of scene types that vary in image complexity, lighting, color and other attributes. Each clip is encoded multiple times at varying levels of compression to produce a large data set containing the types of video anomalies that are produced by compression encoding. As the degree of compression increases the encoder typically ignores fine details and uses larger block sizes, causing blurriness and blockiness in the rendered video, as described supra. Next, we generate a VMAF score for every clip in the data set by passing the data set through the VMAF full-reference algorithm for scoring videos, to obtain a baseline dataset of video clips with VMAF scores for a wide variety of scene types and compression levels. The baseline dataset also contains the reference video associated with each of the encoded clips. In the third step we run the encoded clips in the baseline dataset through the disclosed NR VQA score generator to produce a video quality score for each, which at this stage, like VMAF, is producing a 1 to 100 score. Unlike VMAF, of course, the disclosed technology only "sees" the compressed clip, not the reference video. As the last step, we observe the correlation between the intended score (VMAF's score) and the score generated using the disclosed technology, for each of the thousand compressed clips in the baseline dataset.

Figure 7:
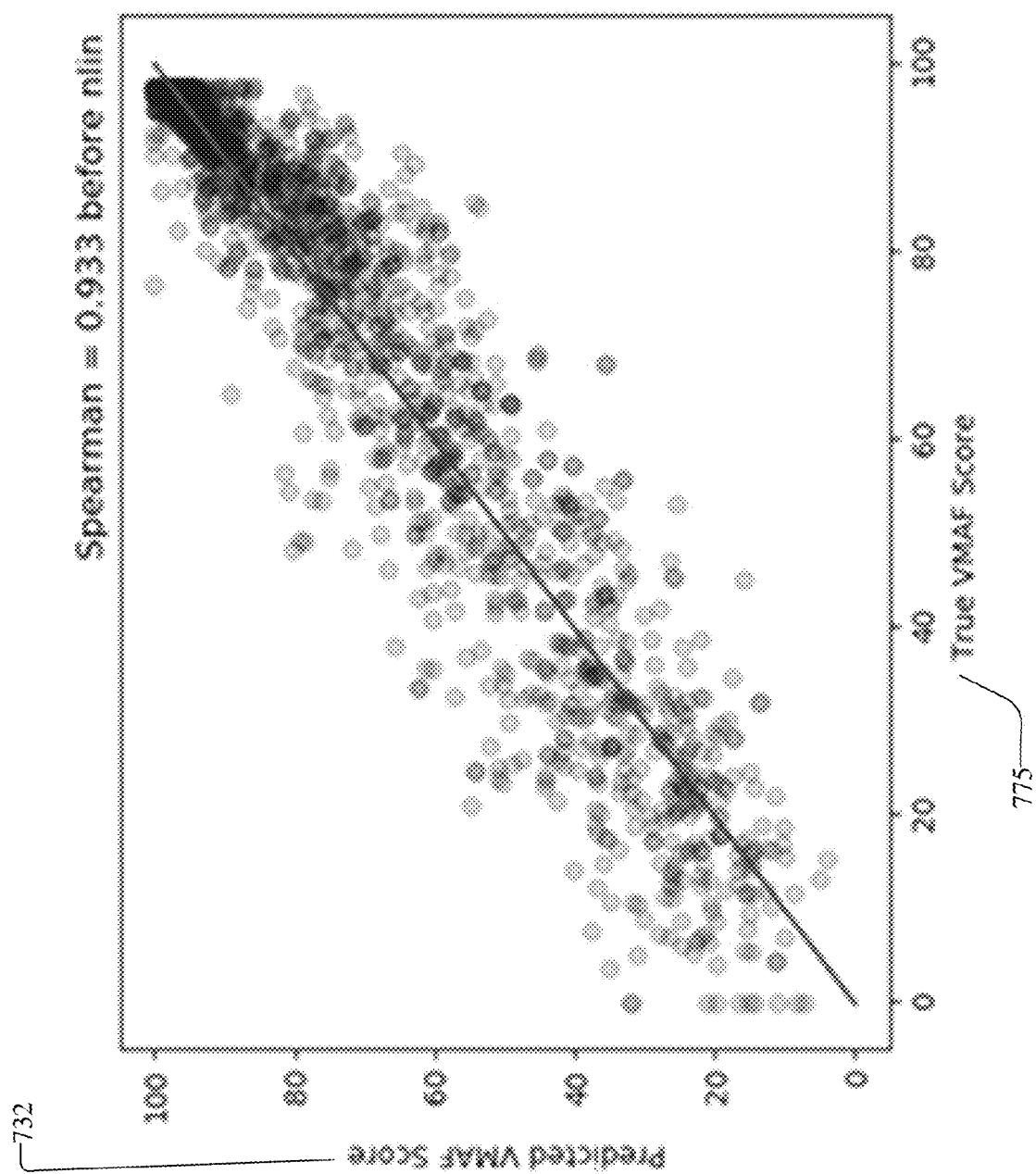
FIG. 7 shows a Spearman correlation graph of true VMAF score and predicted VMAF score obtained using the disclosed technology for training machine learning models to produce no-reference NR VMOS scoring.

FIG. 7 shows a Spearman correlation graph of true VMAF score 775 and predicted VMAF score 732 obtained using the disclosed technology for training machine learning models to produce no-reference NR VMOS scoring. Spearman's rank correlation uses statistics to assess how well the relationship between two variables can be described using a monotonic function. The disclosed technology achieves a Spearman correlation of more than 90% with the VMAF score across the entire baseline dataset.

The disclosed non-reference NR VMOS model offers a very good method of scoring video content without employing a reference for comparison. Using the attributes of the underlying BRISQUE machine learning quality assessment tool and the multi-petabyte training dataset (multiple millions of gigabytes), the disclosed technology produces excellent video quality scores across a very wide variety of scene types and compression levels.

IN VQA Trained and Used for Inference

This section of technology description is about the IN VQA. In this section, the NR VQA is one source for ground truth scores that can be combined with network performance statistics to build a training set and to train the IN VQA.

The disclosed technology includes a system for network operators to use to estimate the quality of video being streamed over their networks without measuring the video payload within the streams or the video displayed on the consumer device. Further, the disclosed technology includes a means for training Impaired network Video Quality Analysis (IN VQA) algorithms using network metrics and non-reference video quality (NR VQA) metrics.

FIG. 8 depicts example architecture 800 for evaluating streaming video delivery quality over a network from a particular video source under varying network conditions, which builds on the architecture 100 of FIG. 1. Components of the Non-Reference Video Scoring System 135 that are used to generate the NR VQA Score Model 166 have the same reference numbers as in FIG. 1. For this part of FIG. 8, refer to the description of FIG. 1.

Architecture 800 supports analysis of streaming video delivery from various sources 802 to various devices 807. Features described can be consolidated or broke into more boxes. The system includes a non-reference VQA model 166 to generate scores that are then used to train an impaired network video quality analyzer (IN VQA) to classify network metrics for source and device pairs generate IN VQA scores. Streaming video source 802, network policy and impairment generator 804, video of varying quality 806 and network metrics 806 are included in the impaired network video generator 805. Network policy and impairment generator 804 modifies packets from the streaming video source 802 to introduce specific impairments, including packet delay, packet delay variations, lost packets, duplicate packets, out-of-order packets and errored packets. It also controls bandwidth, such as TCP flow control. Network metrics collector 816 automatically synchronously collects packet stream metrics such as packet delay, packet delay variations, lost packets, duplicate packets, out-of-order packets, and errored packets, resulting in retransmission requests and packet retransmissions. From packet behavior, the system can infer as stalls, buffering and startup time. In some implementations, codec parameters are available, unencrypted, in either the video stream or a control stream. When available, codec parameters can be included among the network metrics 818. These metrics are one input to a machine learning system for classifying IN VQA as described next.

The video generator 805 controls generation of video of varying quality 806. For YouTube, for instance, the video generator 805 may have, for instance, twenty-five videos that are referenced at YouTube deep URLs for testing. The video generator 805 may cause the device 807 to open a YouTube app and repeatedly request each of the twenty-five videos, synchronized with network and bandwidth impairment by the impairment generator 804. During playback, impairment generator 804 manipulates network conditions, passes along packets comprising video frames 806 and makes network metrics available to network metrics collector 816. The packets comprising video frames 806 are rendered by a device 807 into video images.

The video generator can select a streaming video service, such as Netflix, Hulu, or Xfinity, or can cycle among services. Each service has unique methods of encoding, bitrate selection, buffering, and transmission that impact the network metrics and video quality. Also, the streaming video services use adaptive bitrate (ABR) methods to ensure that users can receive video at various bitrate and quality levels. In order to have a well-trained model, we simulate various network conditions to force the streaming video service to change its methods and measure the resulting network and video quality metrics. Additionally, we include a wide range of content type such as drama, action, sports, cartoons, historical, so we collect a large set of data that covers many network conditions and resulting network quality, to train the system.

Technology such as disclosed in U.S. Pat. No. 9,591,300 B2 can electronically capture rendered video via a high definition multimedia interface (HDMI). Two examples of wired HDMI interfaces are mobile high-definition link (MHL) and SlimPort, an interface based on the Mobility DisplayPort standard. An example of a wireless HDMI interface is Miracast, a peer-to-peer wireless screencasting standard. Miracast can operate by forming a direct Wi-Fi Direct connection with a dongle mounted in an HDMI port of a display. The disclosed technology also includes capturing rendered video via other technology that implements the HDMI specification, which specifies multiple modes of uncompressed digital video out (often called "clean HDMI"). Cabled HDMI is preferred to wireless HDMI to eliminate noise introduced by communication with the mobile device video under test (DUT), which cannot readily be separated from the reproduction being tested. Other measures can be taken to control RF channel conditions. Electronic capture technology does not depend on projection or capture lenses, avoiding projective transformation and lens distortion that occur in the analog domain when optically capturing the appearance of an LCD or LED screen. For example, lens distortion causes squares to appear slightly spherical with a wide-angle lens effect. These lens distortions are not present in HDMI captured images, without projection or capture lenses.

In an alternative, analog implementation, a camera can be used to optically capture the appearance of the LCD or LED screen. This can produce lens distortion. A video with a known checkerboard pattern would be captured and analyzed to compensate and to calculate a correction for the lens distortion from the test pattern. In both implementations, video frames are captured.

From control messages optionally combined with video capture, the system can directly measure stalls, buffering and startup time. Network statistics can be enough to infer the stalls, buffering and startup time. Video capture can be used to confirm inferred statistics or to refine inferences as to correlation of network traffic and video display. The captured video frames and network metrics are correlated, for instance by time stamps.

The captured video can be scored by NR VQA score model 166 or an alternative image scorer. The NR VQA does not need access to pristine video to generate a score for video received over an impaired or bandwidth limited channel. Sets of correlated network metrics and video quality scores are combined as an IN VQA ground truth training set 809.

In practice, training examples 809 are likely to be captured across many device and source pairings. These training examples can be annotated with device and source. They also can be annotated with video genre. Training examples may form sets for particular videos, with examples from multiple scenes in a particular video. Given typical scene lengths in entertainment video, as opposed to training video, sample frames can be separated by a predetermined minimum time difference. Or, a scene detector could be applied to trigger network statistic and video frame retention or to select captured data for the training set. Samples from different scenes of an entertainment video are useful, because video service codecs can be tuned to change encoding between scenes, adapted to how the scene is changing from frame-to-frame. For the sake of clarity, components that assemble video capture and network metrics into a training set are not included in FIG. 8.

Once a training set 809 has been assembled, the data is used can be used for training a classifier, such as presenting support vectors to train a support vector machine (SVM) training. A support vector can include any or all of network metrics identified above. The SVM is trained to produce video quality metrics that match ground truth video quality scores in the training set.

Applying system 800, with either an NR VQA score model 166 or another scorer, a complete set of captured video frames, automatically calculated VMOS scores and the network metrics 818 are automatically synchronously collected and correlated, for use building a hyperplane regressor which represents the disclosed impaired network model which is the basis of our IN VQA system. The training set inputs are used for training IN VQA classifier 868, which can be implemented as an SVM. (Alternatively, a deep learning classifier can be trained, one using either a CNN or RNN.) That is, the complete set of training vectors can be used as support vectors to build a hyperplane regressor that is represented in FIG. 8 as IN VQA score model 878. The more tightly constrained the training samples are, the more precise the results models will be in predicting scores for similarly constrained videos. Hence, for the disclosed technology, IN VQA models can be developed for each streaming service, to take into account the differences in encoding techniques, bitrates, and resulting quality for each service, and for each type of device receiving video 807. This can be implemented as entirely separate models or, alternatively, in one model that accepts input parameters that distinguish among streaming services. A separately trained IN VQA score model scores video quality for an iPhone, an Android, for each type of tablet, for an augmented reality and virtual reality (AR/VR) display, smart TV, set top box or gaming platform, also can be generated, or input parameters can distinguish among devices.

An SVM trained model improves in accuracy and effectiveness as the number of data points supporting the hyperplane regressor increases. Multiple test facilities can collect video. A target for collected training content may be 5,000 hours or 10,000 hours, which is more quickly collected using multiple devices and network impairment emulators. A cloud compute-platform capable of processing thousands, or even millions, of training samples, such as Amazon EC2, can process a large base of training video samples and produce the number of support vectors required to create accurate models within a reasonable number of hours or days.

Figure 9:
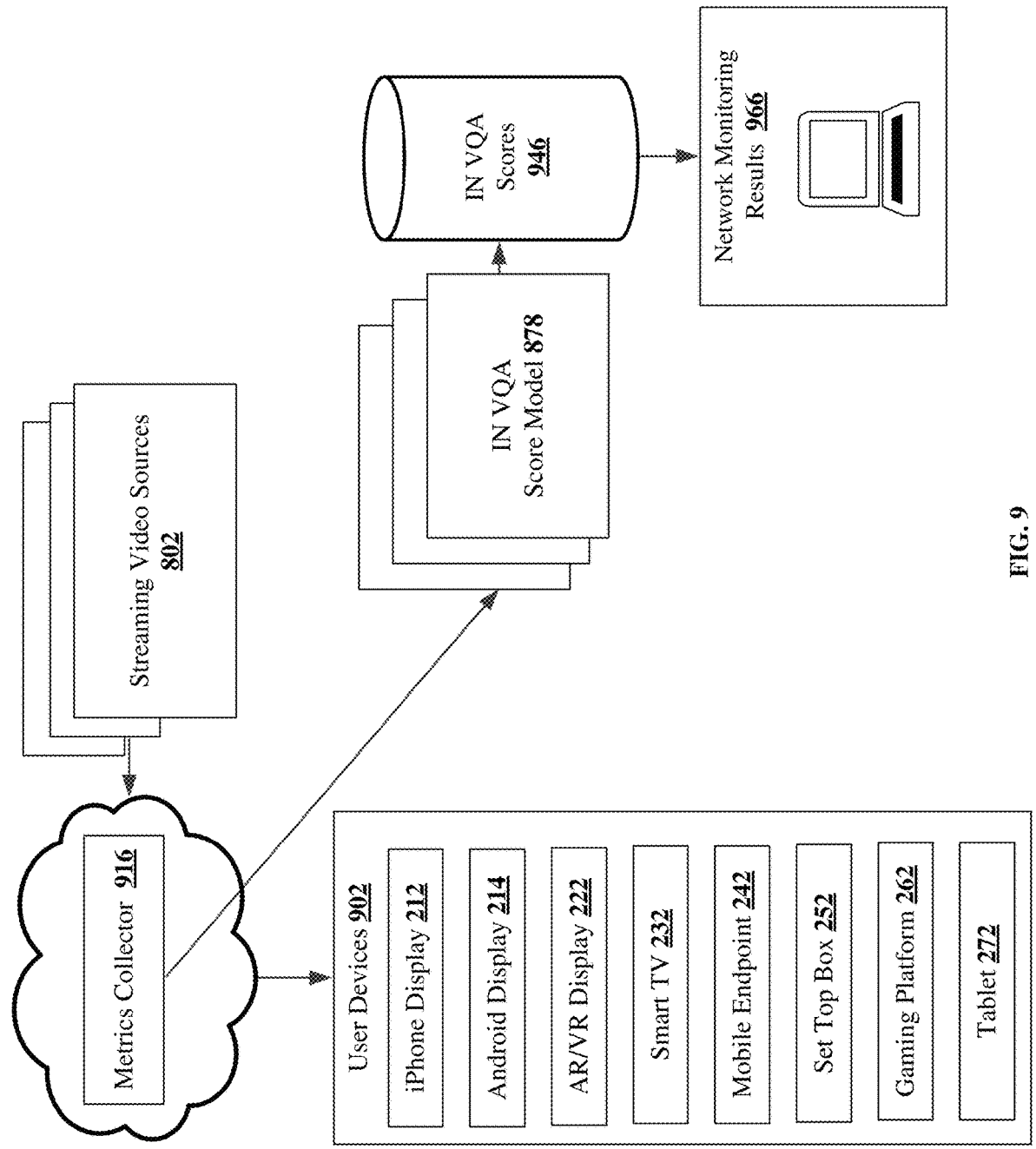
FIG. 9 is a high-level block diagram of using a trained IN VQA to monitor a live network.

FIG. 9 depicts example architecture 900 for applying a IN VQA classifier to a live network. A network metrics collector 916, akin to 816 during training, collects network statistics. At a basic level, this includes statistics for packet traffic. At a more sophisticated level, in an alternative implementation, it also can include correlation of IP addresses from packets with video services. The metrics collected can include, in some implementations, codec identifiers and codec parameters. Selected inputs used in the training phase to train the IN VQA 878 can be collected by the network metrics collector 916 during inference phase and provided to the IN VQA. Video quality scores are generated by the trained IN VQA classifier.

Over time and across customers, video quality experience scores can be aggregated. An individual's experience can be scored, or a geographic group, or group that uses a particular device, or all users of a particular service, for instance. Aggregation and segmentation are broadly supported by applying detailed identifying labels to samples.

In turn, a network operator can use data that it collects regarding inferred user experiences to control bandwidth allocated to video delivery, equitably assuring that users with various devices or service plans obtain similar viewing experience across video service providers. Video service providers can compare the quality of the service that they deliver to other carriers and evaluate the efficiency of their codecs. New compression algorithms can be benchmarked. Bandwidth can be allocated. Many uses can be made of good data regarding user video quality experience on live networks.

Figure 10:
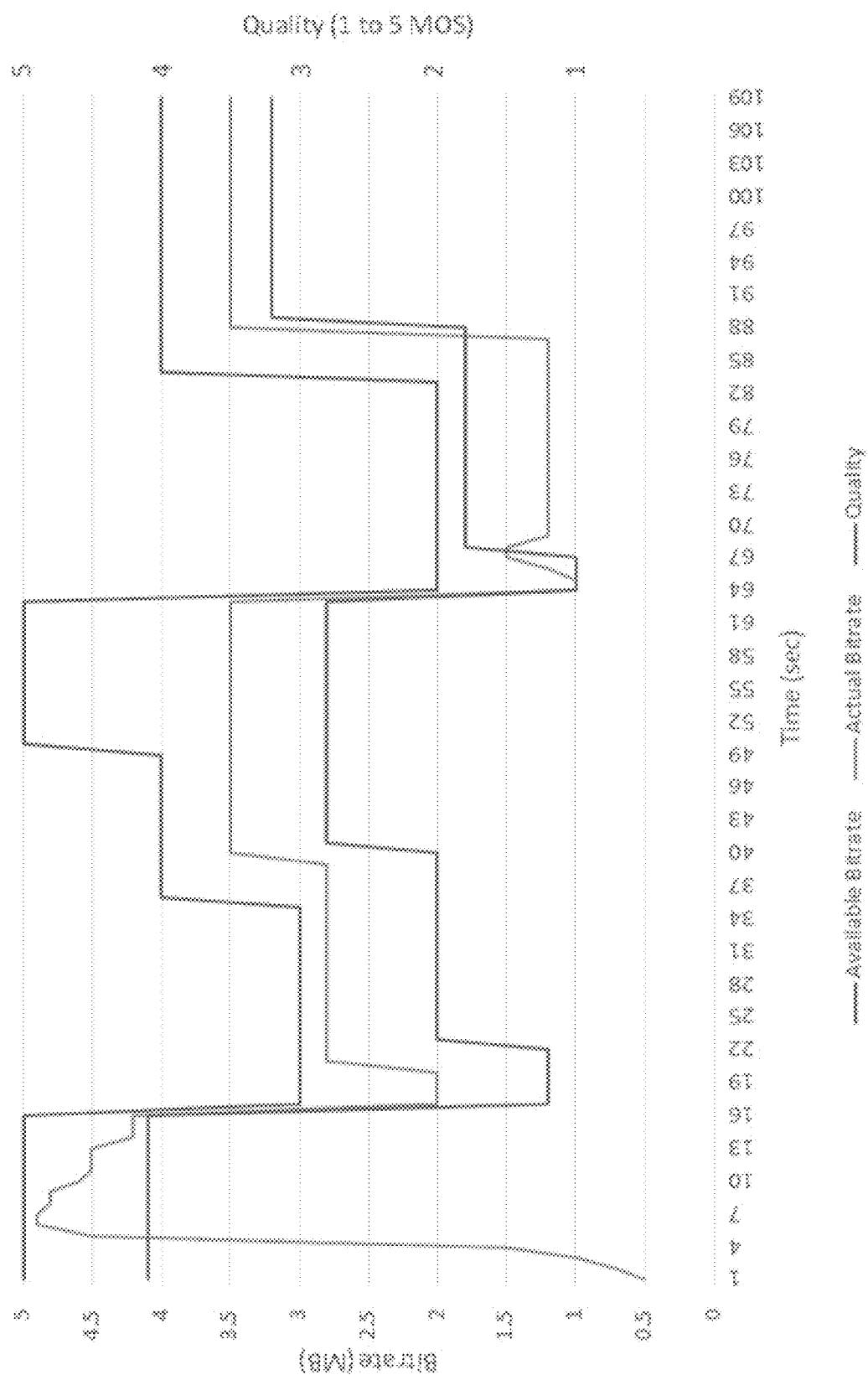
FIG. 10 illustrates synthetic impairment of available bandwidth and response of a user device and video source pair to the impaired network conditions.

FIG. 10 illustrates operation of the impairment generator 804 during creation of training data. The blue line indicates manipulation of available bandwidth. It begins at 5 Mb, drops to 3 Mb, rises to 4 Mb, rises to 5 Mb then drops to 2 Mb, etc. The impairment generator 804 can control available bandwidth on the network in this pattern or some other selected pattern. The user device and app will make requests for video at specific bitrates and receive averaged bitrates indicated by the orange line collected by the Network Metrics Collector 816. The resulting quality measured as a mean option score using the NR VQA is indicated by the green line captured by Video Capture 808 and Scored by the NR VQA Score Model 166. In reality the values are not as steady (flat) as they are shown here for illustration. The data illustrated here is used in the training process 868 to generate the IN VQA Score Model 878. This type of data would be gathered across multiple providers, content types, and devices. The resulting IN VQA Score Model 878 can predict any quality given the bitrate characteristics and provider shown in FIG. 11.

Figure 11:
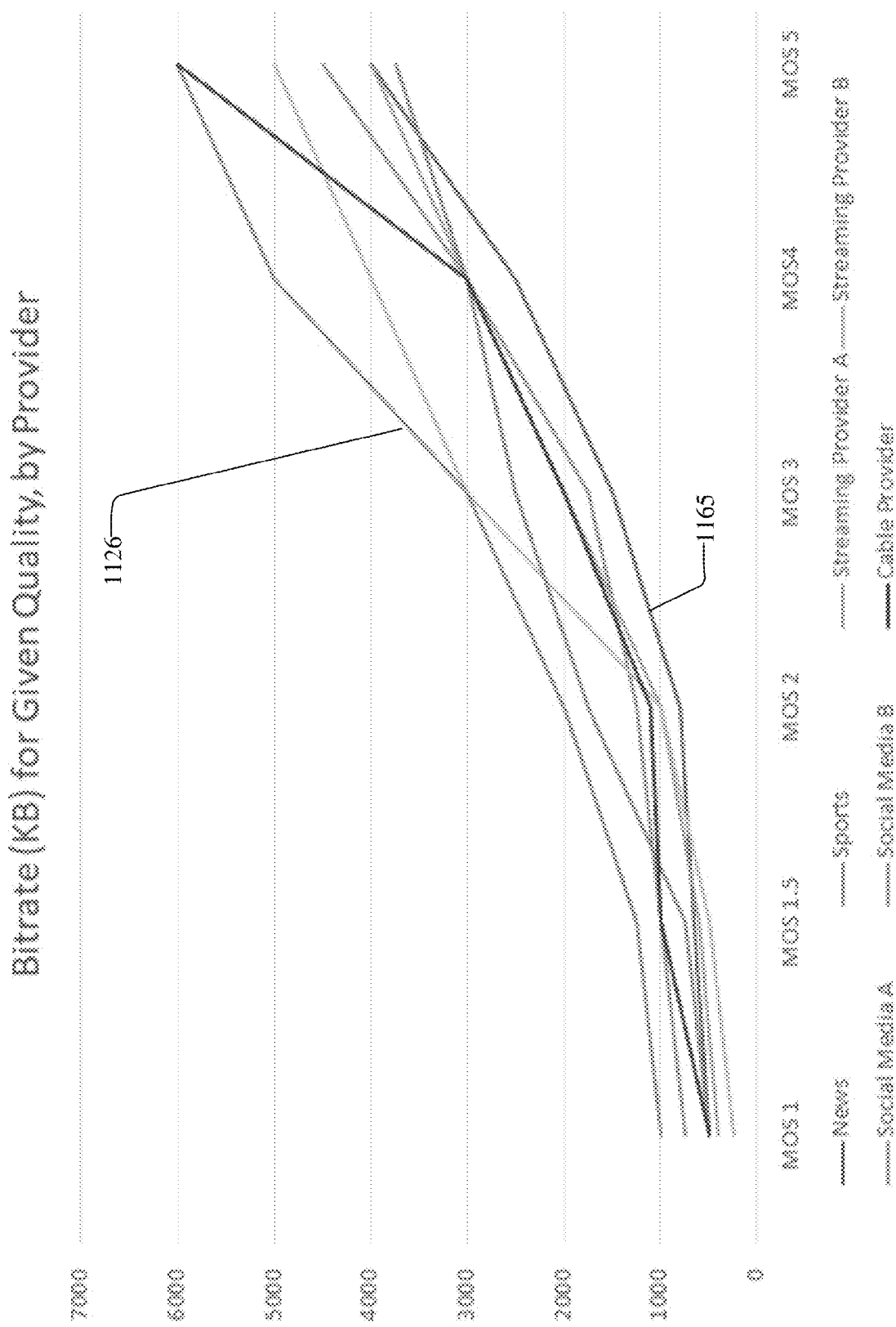
FIG. 11 illustrates bitrates of various providers, reflecting codecs selected for their content type.

FIG. 11 reports the predicted quality levels across providers, as generated by IN VQA Score Model 878 and displayed via network monitoring results 966. The predicted quality levels can be a combination of Mean Opinion Scores (MOS) or video resolution. The Social Media B provider 1126 has the highest bit rate for low quality, which is not surprising. Content by users on smartphones and uploaded for sharing involves rapidly changing scenes with complex video encoding. Provider News 1165 has the lowest overall bit rates among providers for comparable bitrates, as the content is captured in a studio under controlled conditions, with high quality equipment and is easier to encode. In reality, the various levels of bitrate and quality are numerous.

Computer System

Figure 12:
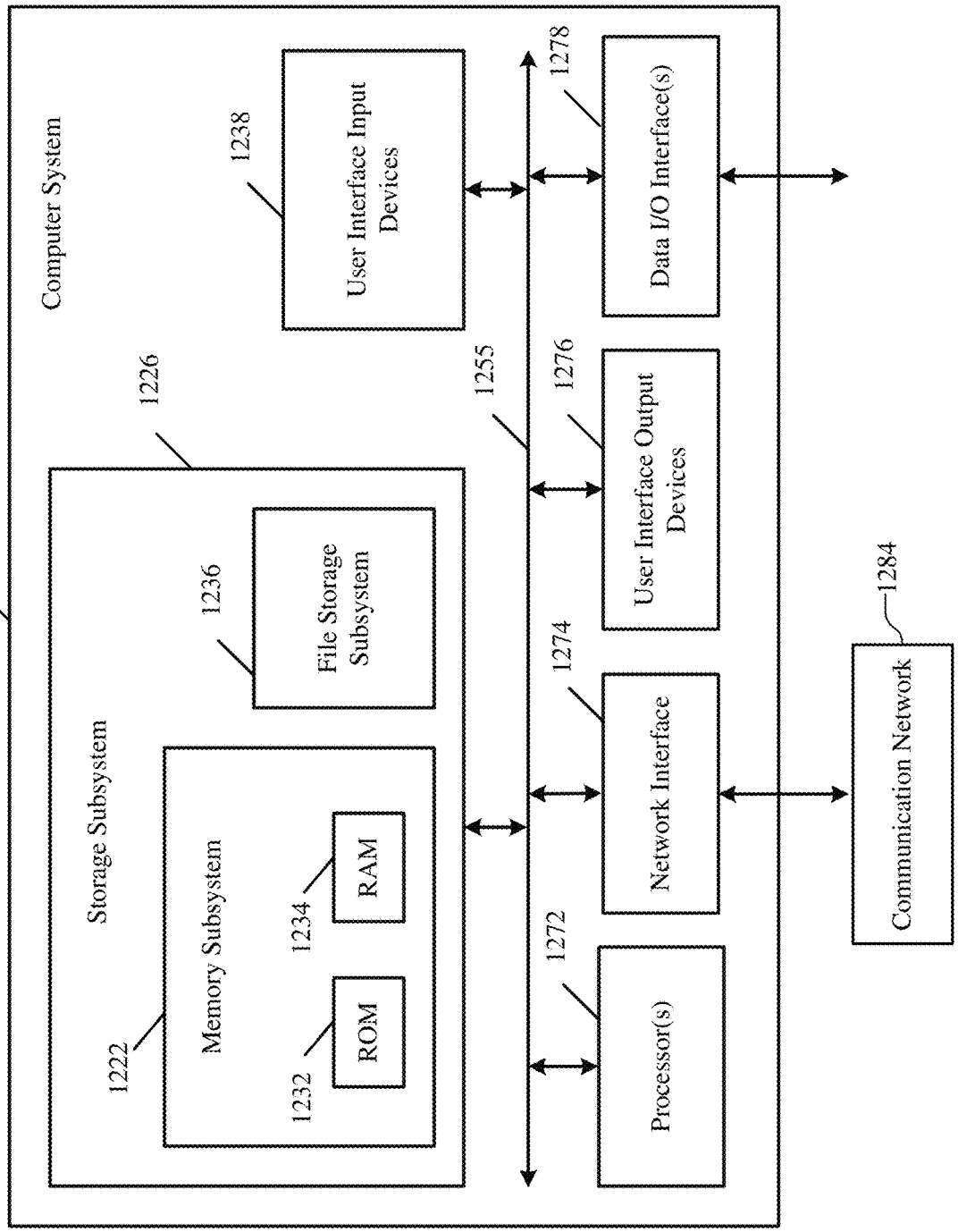
FIG. 12 is a high-level block diagram of an example computer system that can be used to train and operate an IN VQA.

FIG. 12 is a simplified block diagram of a computer system 1200 that can be utilized for evaluating streaming video delivery quality over a network from a particular video source under varying network conditions, according to one implementation of the technology disclosed. Computer system 1200 is also usable for generating a no-reference video mean opinion score (NR VMOS) using a trained NR VMOS score generator.

Computer system 1200 includes at least one central processing unit (CPU) 1272 that communicates with a number of peripheral devices via bus subsystem 1255. These peripheral devices can include a storage subsystem 1210 including, for example, memory devices and a file storage subsystem 1236, user interface input devices 1238, user interface output devices 1276, and a network interface subsystem 1274. The input and output devices allow user interaction with computer system 1200. Network interface subsystem 1274 provides an interface to outside networks, including an interface to corresponding interface devices in other computer systems.

In one implementation, the training set generator, ground truth generator and NR VQA classifier of FIG. 1 can be communicably linked to the storage subsystem 1210 and the user interface input devices 1238 can be communicably linked to performance benchmark analysis interface of FIG. 2. User interface input devices 1238 can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 1200.

User interface output devices 1276 can include a display subsystem, a printer, a fax machine, or non-visual displays such as audio output devices. The display subsystem can include an LED display, a cathode ray tube (CRT), a flat-panel device such as a liquid crystal display (LCD), a projection device, or some other mechanism for creating a visible image. The display subsystem can also provide a non-visual display such as audio output devices. In general, use of the term "output device" is intended to include all possible types of devices and ways to output information from computer system 1200 to the user or to another machine or computer system.

Storage subsystem 1226 stores programming and data constructs that provide the functionality of some or all of the modules and methods described herein.

Memory subsystem 1222 used in the storage subsystem 1226 can include a number of memories including a main random-access memory (RAM) 1232 for storage of instructions and data during program execution and a read only memory (ROM) 1234 in which fixed instructions are stored. A file storage subsystem 1236 can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem 1236 in the storage subsystem 1210, or in other machines accessible by the processor.

Bus subsystem 1255 provides a mechanism for letting the various components and subsystems of computer system 1210 communicate with each other as intended. Although bus subsystem 1255 is shown schematically as a single bus, alternative implementations of the bus subsystem can use multiple busses.

Computer system 1210 itself can be of varying types including a personal computer, a portable computer, a workstation, a computer terminal, a network computer, a television, a mainframe, a server farm, a widely-distributed set of loosely networked computers, or any other data processing system or user device. Due to the ever-changing nature of computers and networks, the description of computer system 1200 depicted in FIG. 12 is intended only as a specific example for purposes of illustrating the preferred embodiments of the present invention. Many other configurations of computer system 1210 are possible having more or less components than the computer system depicted in FIG. 12.

The preceding description is presented to enable the making and use of the technology disclosed. Various modifications to the disclosed implementations will be apparent, and the general principles defined herein may be applied to other implementations and applications without departing from the spirit and scope of the technology disclosed. Thus, the technology disclosed is not intended to be limited to the implementations shown, but is to be accorded the widest scope consistent with the principles and features disclosed herein. The scope of the technology disclosed is defined by the appended claims.

Some Particular Implementations

Some particular implementations and features are described in the following discussion. The implementations disclosed include all the statutory classes of articles of manufacture, methods and systems. As with most computer implemented inventions, computer instructions can be held by a computer readable media, which in this application is a non-transitory article of manufacture. The same instructions, when executed, implement a method. When instructions are combined with hardware, a device or apparatus results.

At least three uses of the technology disclosed are immediately recognized. First, a video stream classifier can be trained that has multiple uses. Second, a trained video stream classifier can be applied to monitor a live network. It can be extended by the network provider to customer relations management or to controlling video bandwidth. Third, a trained video stream classifier can be used to infer bit rate switching of codecs used by video sources and content providers. Bit rate switching and resulting video quality scores can be used to balance network loads and to balance quality of experience for users, across video sources. Balancing based on bit rate switching and resulting video quality scores also can be used when resolving network contention.

In one implementation, a disclosed tangible non-transitory computer readable storage media is impressed with computer program instructions that, when executed on a processor, cause the processor to implement a method of building a training data set and training a video stream classifier to assign video quality scores to delivered video streams. The method includes selecting a plurality of video examples from a video source and causing the video source to deliver video streams of the selected video examples, while synthetically impairing packet delivery, including setting available bandwidth. Impairing packet delivery, including setting available bandwidth, causes the video source to modify codec transmission parameters by the synthetically impairing packet delivery. Current video source codecs modify their transmission parameters responsive to available bandwidth and other factors. The method further includes recording network conditions, including measuring at least actual delivered bit rate during the video streams delivery. Video streams of the selected video examples are directed to a mobile device, such as a smart phone or tablet. Alternatively, video streams can be directed to the desktop device, television or monitor. The method includes recording video frames rendered by the mobile or other device from the selected video examples and building a training data set by scoring at least some of the recorded video frames to produce scores and correlating the scores with the recorded network conditions. The method includes using the scores, an identifier of the video source, and the correlated network conditions as a ground truth for training the video stream classifier to assign video scores without dependence on rendering the video streams. The method can include saving parameters of the trained video stream classifier for use on a live network.

This architecture and other implementations of the technology disclosed can include one or more of the following features and/or features described in connection with additional architectures disclosed. In the interest of conciseness, the combinations of features disclosed in this application are not individually enumerated and are not repeated with each base set of features.

The video frames rendered by the receiving device, such as a smart phone, can be accessed via an HDMI connection. Alternatively, they can be accessed via a wireless connection, such as a casting connection.

The recorded video frames can be scored using a non-reference video classifier that performs the scoring without dependence on access to a reference version, for quality comparison, of the recorded video frames. Non-reference video classifiers are described in the patent application incorporated by reference.

The method can further include selecting the video examples to include variety of scene types that vary in image complexity, lighting and color. Video examples of different genre, such as action, comedy, romance and sports, present various kinds and degrees of coding complexity. Some examples present coding complexity that changes from scene to scene.

Video quality can depend on a combination of the video source and the receiving device, such as a type of smart phone. The method described can be applied to different brands and models and can use the smart phone brand and model as elements of the ground truth for the training.

The program instructions that can be included on an article of manufacture can, when executed on appropriate hardware, perform a computer-implemented method. The same instructions, when combined with hardware and the device, produce a computer implemented system.

Another implementation the technology disclosed is a computer readable media impressed with program instructions that, when executed on hardware, cause the hardware to perform a method of monitoring video quality of delivered video streams on a live network. This method includes measuring network conditions including actual bit rate during delivery of numerous video streams at a plurality of locations on the live network, correlated with data identifying a video source per video stream. The method further includes applying a trained classifier to the measured network conditions and the correlated data to assign video quality scores without dependence on rendering images from the video streams. If desired, the assigned video quality scores can be aggregated based on one or more parameters of the measured network conditions and the identifying data. The method can include storing the video quality score data for the locations on the live network, including raw and/or aggregated video quality scores and correlated parameters.

The plurality of locations can include virtually any number of physical locations in a modern network, such as 100 to 1,000,000 physical locations on the live network. Parametric analysis of performance and scores can be oriented along a large number of alternative factors are dimensions. The numerous video streams at the plurality of locations on the live network can be correlated with data identifying a recipient device type per the video stream or with data identifying a recipient user per the video stream. Whatever data is correlated with scores can be used for aggregation.

In some implementations, monitoring the live network leads to raising an alert to a network operating center when the aggregated video quality scores for a portion of the live network reach an alert level.

The program instructions that can be included on an article of manufacture can, when executed on appropriate hardware, perform a computer-implemented method. The same instructions, when combined with hardware and the device, produce a computer implemented system.

Yet another implementation includes a computer readable media impressed with program instructions that, when executed on hardware, cause the hardware to perform a method of mapping video quality against available bandwidth for a video source over a live network. This method includes repeatedly requesting that the video source deliver selected videos while systematically impairing network conditions at a node of the live network, including setting the available bandwidth, and measuring actual delivered bit rate from the video source under the impaired network conditions. Using the measured actual delivered bit rate, the method includes inferring a bit rate table of the video source by comparing variation in the actual delivered bit rate to the systematic impairment of the network conditions. More than just the delivered bit rate is taken into account, as the method includes applying a trained video stream classifier to determine the video quality delivered by the video source over the live network based on characteristics of the impaired network conditions and/or on actual delivered bit rate. The results of this analysis are made available for multiple purposes by saving the inferred bit rate table and the determined video quality for the video source correlated with the impaired network conditions.

The trained video stream classifier can determine the video quality scores without dependence on rendering images from the video streams.

During training, some implementations include selecting the video examples to include variety of scene types that vary in image complexity, lighting and color.

The bit rates and quality delivered can depend on the recipient device, such as smart phones of different brands and models. The recipient device brand and model can be used as elements of the ground truth for the training.

After completion of training, live network can use at least the inferred bit rate table and the determined video quality for the video source to set available bit rate for particular recipients of live video streams on a live network.

The program instructions that can be included on an article of manufacture can, when executed on appropriate hardware, perform a computer-implemented method. The same instructions, when combined with hardware and the device, produce a computer implemented system.

The technology disclosed can be practiced as a system, method, or article of manufacture. One or more features of an implementation can be combined with the base implementation. Implementations that are not mutually exclusive are taught to be combinable. One or more features of an implementation can be combined with other implementations.

While the technology disclosed is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the innovation and the scope of the following claims.

We claim as follows:

1. A non-transitory computer readable media impressed with program instructions that, when executed on hardware, cause the hardware to perform a method of monitoring video quality of delivered video streams on a live network, the method including:
   measuring network conditions including actual bit rate during delivery of numerous video streams at a plurality of locations on the live network, correlated with data identifying a video source per video stream;
   applying a trained classifier to the measured network conditions and the correlated data to assign video quality scores without dependence on rendering images from the video streams;
   aggregating the assigned video quality scores based on one or more parameters of the measured network conditions and the identifying data; and
   storing at least the aggregated video quality scores.

2. The non-transitory computer readable media of claim 1, further including instructions, that when executed, cause the hardware to perform the method, wherein the plurality of locations include 100 to 1,000,000 physical locations on the live network.

3. The non-transitory computer readable media of claim 1, further including instructions, that when executed, cause the hardware to perform the method, further including:
   the numerous video streams at the plurality of locations on the live network further correlated with data identifying a recipient device type per the video stream.

4. The non-transitory computer readable media of claim 1, further including instructions, that when executed, cause the hardware to perform the method, further including:
   the numerous video streams at the plurality of locations on the live network further correlated with data identifying a recipient user per the video stream.

5. The non-transitory computer readable media of claim 1, further including instructions, that when executed, cause the hardware to perform the method, further including:
   raising an alert to a network operating center when the aggregated video quality scores for a portion of the live network reach an alert level.

6. A method of monitoring video quality of delivered video streams on a live network, the method including executing program instructions from the non-transitory computer readable media of claim 1 on the hardware.

7. A device configurable to monitor video quality of delivered video streams on a live network, the device including the program instructions from the non-transitory computer readable media of claim 1 and the hardware adapted to execute the program instructions.

8. A non-transitory computer readable media impressed with program instructions that, when executed on hardware, cause the hardware to perform a method of mapping video quality against available bandwidth for a video source over a live network, the method including:
   repeatedly requesting that the video source deliver selected videos while systematically impairing network conditions at a node of the live network, including setting the available bandwidth;
   measuring actual delivered bit rate from the video source under the impaired network conditions;
   inferring a bit rate table of the video source from variation in the actual delivered bit rate during the systematically impairing the network conditions;
   applying a trained video stream classifier to determine the video quality delivered by the video source over the live network based on characteristics of the impaired network conditions and/or on actual delivered bit rate; and
   saving the inferred bit rate table and the determined video quality for the video source correlated with the impaired network conditions.

9. The non-transitory computer readable media of claim 8, further including instructions, that when executed, cause the hardware to perform the method, wherein the trained video stream classifier determines the video quality scores without dependence on rendering images from the video streams.

10. The non-transitory computer readable media of claim 8, further including instructions, that when executed, cause the hardware to perform the method, further including:
    selecting the video examples to include variety of scene types that vary in image complexity, lighting and color.

11. The non-transitory computer readable media of claim 8, further including instructions, that when executed, cause the hardware to perform the method, further including:
    applying the requesting, measuring, inferring, applying and saving to a plurality of receiving devices of different brands and models and using the receiving device brand and model as elements of the ground truth for the training.

12. The non-transitory computer readable media of claim 8, further including instructions, that when executed, cause the hardware to perform the method, further including:
    using at least the inferred bit rate table and the determined video quality for the video source to set available bit rate for particular recipients of live video streams on a live network.

13. A method of mapping video quality against available bandwidth for a video source over a live network, the method including executing program instructions from the non-transitory computer readable media of claim 8 on the hardware.

14. A device configurable to map video quality against available bandwidth for a video source over a live network, the device including the program instructions from the non-transitory computer readable media of claim 8 and the hardware adapted to execute the program instructions.

\* \* \* \* \*